United States Patent
Ley et al.

(10) Patent No.: US 11,767,911 B2
(45) Date of Patent: Sep. 26, 2023

(54) METHOD AND CONTROL APPARATUS FOR OPERATING A MULTIPLE-SPEED VEHICLE TRANSMISSION

(71) Applicant: ZF Friedrichshafen AG, Friedrichshafen (DE)

(72) Inventors: Fabian Ley, Friedrichshafen (DE); Jürgen Blaser, Meckenbeuren (DE); Sascha Fiesel, Friedrichshafen (DE); Wolfgang Rapp, Fronhofen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/864,816

(22) Filed: Jul. 14, 2022

(65) Prior Publication Data
US 2023/0023472 A1    Jan. 26, 2023

(30) Foreign Application Priority Data

Jul. 21, 2021   (DE) ..................... 10 2021 207 810.9

(51) Int. Cl.
*F16H 61/682*   (2006.01)
*F16H 59/72*    (2006.01)
(Continued)

(52) U.S. Cl.
CPC .......... *F16H 61/682* (2013.01); *F16H 59/40* (2013.01); *F16H 59/44* (2013.01); *F16H 59/48* (2013.01); *F16H 59/54* (2013.01); *F16H 59/72* (2013.01); *F16H 61/30* (2013.01); *F16H 2200/0043* (2013.01); *F16H 2200/0082* (2013.01)

(58) Field of Classification Search
CPC ... F16D 2500/50808; F16D 2500/5029; F16D 2500/50669
See application file for complete search history.

(56) References Cited

U.S. PATENT DOCUMENTS 7,789,792 B2   9/2010   Kamm et al.
8,418,575 B2   4/2013   Schneider et al.
(Continued)

FOREIGN PATENT DOCUMENTS

DE   10 2005 002 337 A1   8/2006
EP       1 990 561 A1    11/2008

OTHER PUBLICATIONS

German Patent Office, Office Action issued in German Application No. 10 2021 207 810.9 (dated Mar. 30, 2022).

*Primary Examiner* — Timothy Hannon
(74) *Attorney, Agent, or Firm* — FINCH & MALONEY, PLLC

(57) ABSTRACT

Disclosed is a method for operating a multi-speed vehicle transmission having a plurality of shift elements (A, B, C, D, E) for engaging the gears of the vehicle transmission. The method includes decoupling between an input (AN) and an output (AB) of the vehicle transmission in a neutral gear, and coupling the input (AN) and the output (AB) of the vehicle transmission in a drive gear for propelling the vehicle by closing at least one shift element (B). At least one transmission state is determined when the neutral gear is engaged, where a shift element (D) for a reverse gear of the vehicle transmission is closed at least partially if the transmission is in a state with increased drag losses when the neutral gear is engaged.

11 Claims, 1 Drawing Sheet

(51) Int. Cl.
*F16H 59/54* (2006.01)
*F16H 59/40* (2006.01)
*F16H 61/30* (2006.01)
*F16H 59/48* (2006.01)
*F16H 59/44* (2006.01)

(56) References Cited

U.S. PATENT DOCUMENTS

| | | | | |
|---|---|---|---|---|
| 10,836,397 B1* | 11/2020 | Christensen | ........ | F16H 61/0213 |
| 2010/0044140 A1* | 2/2010 | Shultz | ........................ | F16H 3/66 |
| | | | | 180/338 |
| 2013/0079195 A1* | 3/2013 | Nogle | ................. | B60W 30/194 |
| | | | | 477/107 |

* cited by examiner

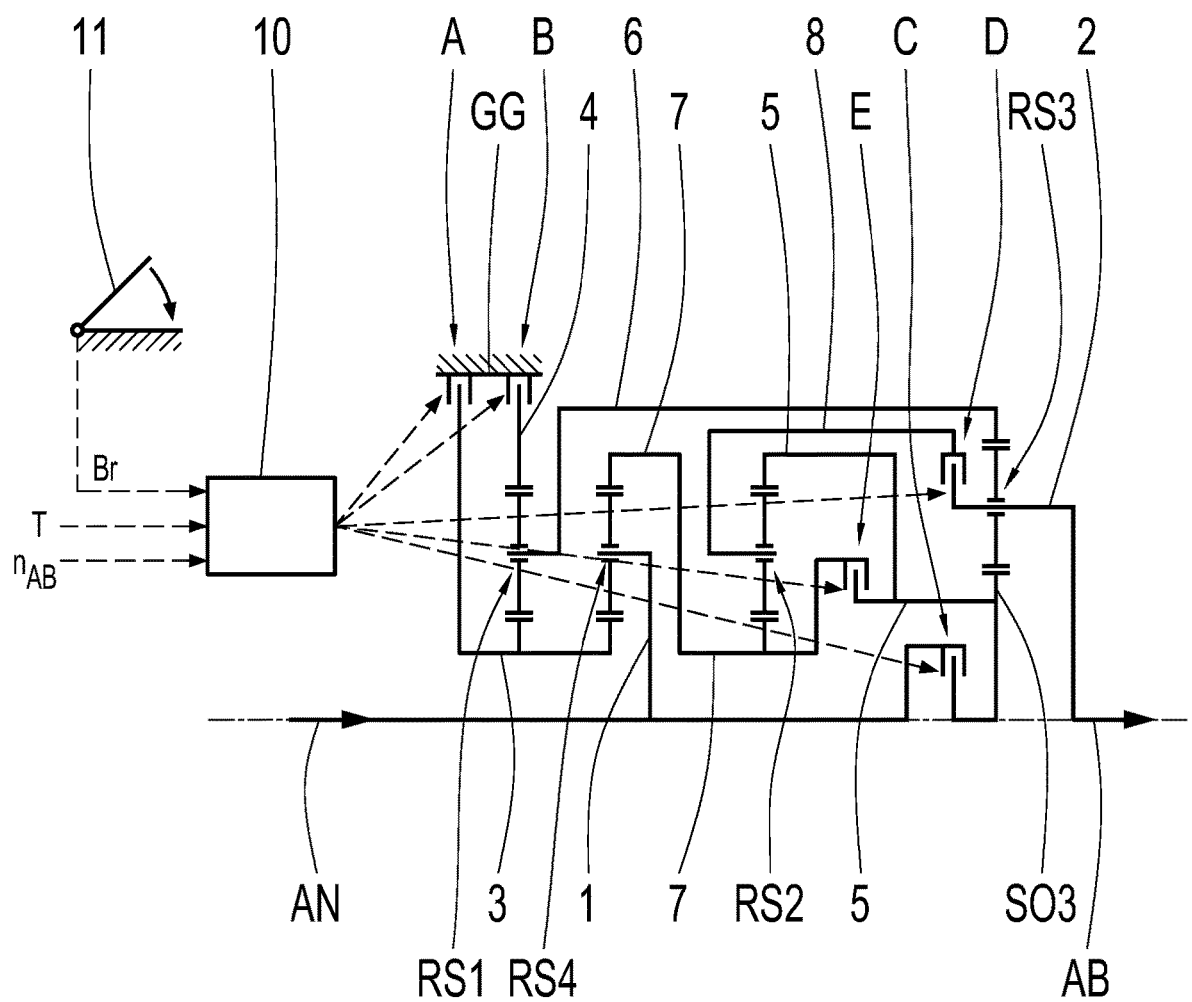

METHOD AND CONTROL APPARATUS FOR OPERATING A MULTIPLE-SPEED VEHICLE TRANSMISSION

RELATED APPLICATIONS

The application claims the benefit of and right of priority under 35 U.S.C. § 119 to German Patent Application no. 10 2021 207 810.9, filed Jul. 21, 2021, the contents of which are incorporated herein by reference in its entirety.

FIELD OF THE DISCLOSURE

The invention relates to a method, a control device and a computer-readable storage medium for operating a multi-speed vehicle transmission.

BACKGROUND

Multi-ratio transmissions are well-known and are widely used in automotive technology. The gears, which are also referred to as stages or transmission stages, represent different gear ratios of the transmission between a transmission input and a transmission output. The gears can be engaged selectively. A torque provided by a drive engine of the vehicle can thus be translated as befits the situation. In a starting gear, for example, a high gear ratio can be provided to accelerate the vehicle. In another drive gear, a lower gear ratio can then be provided to maintain the vehicle speed in a fuel-efficient manner. The individual gears are engaged by means of shift elements of the transmission.

Preferred examples of multi-ratio transmissions can be found in DE 10 2005 002 337 A1, which is incorporated herein by reference in its entirety.

In a neutral gear of the vehicle transmission, also referred to as idling, the transmission input and at least the transmission output used for driving are decoupled from one another. To engage the neutral gear, a sufficiently large number of shift elements of the transmission are opened. In the neutral gear, the vehicle can be pushed or towed. Internal drag losses of the transmission can also be minimized in the neutral gear. Engaging the neutral gear can therefore be advantageous, for example when the vehicle is stopped suddenly while the vehicle's drive engine continues to run. The engagement of the neutral gear can be requested by a user of the vehicle or by an automatic transmission.

When the neutral gear is engaged, the objective in practice is to shift gears into one of the drive gears of the transmission as quickly and comfortably as possible, in particular into the starting gear used for starting.

To prepare for this gear shift, the so-called clearance of at least one of the shift elements for the starting gear can be reduced in a targeted manner.

In the case of a shift element of the transmission actuated via pressure medium, this preparation is carried out by prefilling the actuating piston of the shift element with pressure medium in the neutral gear. To do this, a set quantity of pressure medium is already provided to the actuating piston. This quantity is calculated to be such that the shift element does not close yet. The closing process can then be initiated by providing more pressure medium and/or increasing the pressure in the actuating piston. During prefilling, the shift element is, in particular, brought (almost) to the so-called contact point of the shift element.

SUMMARY

The quantity of pressure medium required for prefilling depends on a number of factors. These are, in particular, the component tolerances and the current state of wear of the respective shift element as well as the current friction conditions in the transmission. Sufficiently precise sensors for exact determination of the required prefilling and the already existing prefilling are not normally provided in vehicle transmissions. Excessive prefilling can cause unwanted (partial) closing of the shift element. This can lead to unwanted rolling of the vehicle in the neutral gear. Too little prefilling can cause the shift element to close late and/or uncomfortably when shifting from the neutral gear to the drive gear.

The object of the invention is the safe operation of a multi-speed vehicle transmission.

This object is respectively achieved by the features of the present disclosure. Preferred embodiments thereof can be found in the independent claims and subclaims.

The invention is therefore based on a multi-ratio vehicle transmission which comprises a plurality of shift elements for engaging the gears of the vehicle transmission. The transmission comprises at least one neutral gear as well as at least one drive gear configured as a forward gear and one drive gear configured as a reverse gear. In the neutral gear, a decoupling between an input and an output of the vehicle transmission is provided. The neutral gear therefore corresponds to an idling of the transmission.

In the drive gear, on the other hand, a coupling of this input and output is provided for the purpose of propelling the vehicle. This coupling is achieved by closing at least one of the shift elements of the vehicle transmission. The gear shift from the neutral gear to the drive gear therefore takes place by closing at least this shift element. This shift element can, in particular, be actuated via a pressure medium, for example hydraulically or pneumatically.

It is now provided that at least one transmission state of the vehicle transmission is determined when the neutral gear is engaged. If the transmission is in a state with increased drag losses when the neutral gear is engaged, it is provided that a shift element for a reverse gear of the vehicle transmission is closed at least partially.

In the partially closed state, power or torque transmission is already provided via the shift element. The shift element of the reverse gear can also be closed completely when the neutral gear is engaged and the transmission is in a state with increased drag losses. In the partially closed state, the power or torque transmission via the shift element is lower than in the completely closed state.

Closing the shift element for the reverse gear at least partially reverses a direction of torque at the output of the vehicle transmission, as a result of which the increased drag torques of the vehicle transmission are offset. A reduced torque is then present at the output of the vehicle transmission. The at least partial closing of the shift element for the reverse gear can thus prevent an unwanted rolling state of the vehicle.

The further shift elements of the vehicle transmission are preferably ventilated, i.e. open, when the neutral gear is engaged and the transmission is in a state with increased drag losses.

When the neutral gear is engaged, an actuation state of a vehicle brake is preferably determined in addition to the transmission state. A distinction is made, in particular, between the actuation state "vehicle brake released" (vehicle can start rolling) and "vehicle brake actuated" (vehicle is braked). If an actuated vehicle brake is determined when the neutral gear is engaged, it is provided that the shift element for the reverse gear of the vehicle transmission is opened and at least one shift element for a forward gear of the vehicle transmission is preloaded or at least prefilled with pressure medium.

When the vehicle brake is actuated, the shift element for the forward gear can safely be prepared for the gear shift, i.e. prefilled or preloaded, when the neutral gear is engaged. It is thus possible to shift quickly and comfortably from the neutral gear to the drive gear. This reduces the reaction time when engaging a gear.

The invention is based on the insight that, as long as the vehicle brake is being actuated, there is no danger of unwanted starting of the vehicle when the neutral gear is engaged. Only after the vehicle brake has been released could the prefilling or preloading of the shift element lead to unwanted starting. It was also discovered that, in practice, the risk of unwanted starting when the neutral gear is engaged and the service brake is released occurs only in a transmission state with increased drag losses. In this transmission state, the drag torques that occur in the transmission are higher than those that occur in a normal, warm operating state.

The transmission state with increased drag losses occurs, in particular, when the vehicle transmission has not yet reached a suitable temperature. When the transmission is cool, the contained lubricant (usually transmission oil) has a relatively high viscosity. Component friction and splash losses in the transmission are correspondingly high. A shift element that is correctly prefilled or preloaded under normal operating conditions can nonetheless unintentionally transmit torque under these circumstances.

This transmission state is therefore in particular equivalent to a "cold" vehicle transmission. This transmission state can occur, for example, when the transmission lubricant falls below a specific temperature, in particular below 40° C. This can be determined by a temperature sensor of the vehicle transmission, for example.

As already explained above, the vehicle transmission is a multi-ratio vehicle transmission comprising a plurality of shift elements for engaging the gears of the vehicle transmission. The shift elements can be referred to as transmission shift elements and can be configured as clutches and/or brakes. At least the one shift element for the drive gear can be configured to be actuated via pressure medium. Preferably, all of the shift elements for the travel gears of the transmission are actuated in this manner. In particular, the lubricant of the vehicle transmission is used as the pressure medium. The shift element or shift elements are preferably frictionally engaged shift elements; each one is, in particular, a multi-disc clutch or multi-disc brake. The vehicle transmission is, in particular, an automatic transmission having a planetary design.

The actuation of the shift elements is controlled by the likewise proposed transmission control device. The transmission control device thus causes the shift elements to be actuated as befits the situation.

The vehicle transmission is preferably configured as a transmission according to DE 10 2005 002 337 A1. For further details on these transmissions, explicit reference is made to the disclosure in this document. The vehicle transmission is particularly preferably configured in accordance with FIG. 4 of the aforementioned document. The shift elements included there are labeled as A, B, C, D, E. The vehicle transmission can be configured for use in a motor vehicle, in particular for use in a passenger car, truck, or bus. The vehicle transmission can, however, also be configured for use in a rail vehicle, an agricultural vehicle, or in other vehicles.

A drive gear is understood to mean the gears of the vehicle transmission that are provided for propelling the vehicle, i.e. forward gears and reverse gears.

The transmission input and transmission output of the vehicle transmission are coupled to one another by at least one of the shift elements of the transmission. In the neutral gear of the vehicle transmission, on the other hand, it is provided that the transmission input and transmission output are decoupled from one another. In the neutral gear, therefore, no propulsion of the vehicle via the vehicle transmission is provided.

The drive gear is preferably a starting gear for starting the vehicle. Such a starting gear is, in particular, a gear that has a gear ratio that is high compared to that of other gears of the vehicle transmission. In particular, therefore, the other gears of the vehicle transmission have lower gear ratios. Such a starting gear is, in particular, the first gear. The starting gear can vary depending on the situation at hand. If a low vehicle load is detected, for example, a second gear can be selected as the starting gear as well. Depending on the situation, it is also possible to select a reverse gear as the starting gear. In the neutral gear then, the shift element associated with the selected starting gear can be prefilled or preloaded in preparation for the gear shift into the starting gear.

In the prefilled or preloaded state, no power or torque transmission is provided via the shift element. In the partially closed or closed state, power or torque transmission is provided via the shift element.

The operation of the vehicle transmission is preferably monitored continuously or at regular intervals. It is determined, in particular, whether the neutral gear is engaged, whether the vehicle brake is released, whether the transmission is in a state with increased drag losses, and whether the vehicle is in a state in which it is rolling. For this purpose, in particular, sensor information is evaluated from sensors of the vehicle and vehicle transmission that is indicative of these conditions.

A determination is made as to whether the neutral gear is actually engaged. This can be done in any way. For example, it can be done using actuation signals for valves of the vehicle transmission for actuating the shift elements.

Alternatively, or additionally, it can be done using pressure signals from one or more pressure sensors of the vehicle transmission for the pressure medium. Alternatively, or additionally, it can be done using rotation speed signals from one or more rotation speed sensors of the vehicle transmission. Other determination methods not explicitly mentioned here can also be used. This determination is also carried out for other purposes, in particular, for the correct control of the transmission by the transmission control device and/or for displaying the currently engaged gear on a screen inside the vehicle.

The determination whether the transmission is in the state with increased drag losses can likewise be done in any way. This can be done using a transmission temperature, in particular a temperature of the transmission lubricant (oil temperature). For this purpose, a temperature sensor is preferably provided on the vehicle transmission. Alternatively, or additionally, this can be done using a temperature model of the vehicle transmission. Alternatively, or additionally, this can be done using an elapsed time since an engine start of a drive engine of the vehicle that is coupled or capable of being coupled to the vehicle transmission. Other determination methods not explicitly mentioned here can also be used. The determined transmission temperature or the elapsed time is preferably compared with a threshold value. If the transmission temperature or the elapsed time is below the threshold value, it is assumed that the transmission is in the state with increased drag losses. On the other hand, if the transmission temperature or the elapsed time is above the threshold value, it is assumed that the transmission is not in the state with increased drag losses. The transmission is then warmed up and the drag losses in the transmission are therefore sufficiently reduced. The threshold value for the temperature is preferably between 30° C. and 50° C. A particularly suitable threshold value for the temperature is between 35° C. and 45° C., in particular 40° C.

The determination of whether the vehicle brake is released can likewise be done in any way. When the vehicle brake is released, no deceleration or braking force is requested via the brake. When the vehicle brake is actuated, on the other hand, some deceleration or braking force is requested via the brake.

The vehicle brake is in particular a service brake of the vehicle, in particular a brake system of the vehicle comprising disc or drum brakes. The vehicle brake is in particular a parking brake of the vehicle. This can be done using a brake signal. This brake signal can represent the deceleration or braking force desired by an operator or system of the vehicle. The brake signal can be output by a position sensor mounted on the brake pedal or the brake lever of the vehicle. The brake pedal and the brake lever are both used by the operator of the vehicle to set the deceleration or braking force. Alternatively, or additionally, this can be done using a brake pressure active in the brake system. If, for example, the brake signal or the brake pressure falls below a certain threshold value or is not present, the vehicle brake is released. Other determination methods not explicitly mentioned here can also be used.

The vehicle transmission can be configured such that at least two shift elements of the vehicle transmission are closed in the drive gear. In other words, at least these two shift elements have to be closed in order to engage the drive gear. When the neutral gear is being engaged and the vehicle brake is actuated, the first of the two shift elements can be preloaded or prefilled with pressure medium to engage the drive gear, and the second of the two shift elements can be closed to engage the gear. Both shift elements are thus being prepared for the gear shift into the drive gear. It is thus possible to shift from the neutral gear to the drive gear particularly quickly and comfortably.

In one design of the proposed method, when the neutral gear is engaged, the first of these shift elements is first ventilated once it has been detected that the vehicle brake is being released and the transmission is in the state with increased drag losses. The first shift element is thus brought safely into the open state in a targeted manner. As a first safety level, this prevents the vehicle from starting despite the neutral gear being engaged.

The second of these shift elements, on the other hand, is ventilated when the neutral gear is engaged once it has been detected that the vehicle brake is being released and the transmission is in the state with increased drag losses and the vehicle is in the rolling state.

In this rolling state, the vehicle is moving forward. The second shift element is thus also brought into the safely open state in a targeted manner. As a result, therefore, a rolling state of the vehicle can be stopped at a second safety level.

At a third safety level, it is further provided that a shift element of the reverse gear of the vehicle transmission is closed at least partially when the neutral gear is engaged and the vehicle brake is released only once it has been detected that the vehicle is in the rolling state despite a ventilated first shift element and ventilated second shift element. The shift element of the reverse gear is then brought into an at least partially closed state in a targeted manner. This reverses a direction of torque at the output of the vehicle transmission, as a result of which the increased drag torques of the vehicle transmission are offset and an unwanted rolling state of the vehicle is prevented.

Determining whether the vehicle is in the rolling state can be done in any way. This is done, in particular, using an output rotation speed of the vehicle transmission, i.e. a rotation speed at the transmission output. For this purpose, a rotation speed sensor can be provided at the transmission output. This rotation speed sensor is usually already provided for other purposes. Alternatively, or additionally, this can be done using a wheel rotation speed of the vehicle. Rotation speed sensors of an anti-lock braking system of the vehicle brake can be used for this purpose, for example. Alternatively, or additionally, this can be done using an acceleration of the vehicle. An acceleration sensor of the vehicle can be used for this purpose, for example. If the rotation speed or the acceleration exceeds a certain threshold value, for example, the vehicle is in the rolling state. Other determination methods not explicitly mentioned here can also be used.

The vehicle transmission is preferably configured such that at least or exactly three shift elements of the vehicle transmission are closed in the drive gear. In other words, at least or exactly these three shift elements have to be closed in order to engage the drive gear.

When the neutral gear is being engaged and the vehicle brake is actuated, the first of these shift elements is now preloaded or prefilled with pressure medium, the second of these shift elements is closed and the third of these shift elements is ventilated.

All three shift elements are thus being prepared for the gear shift into the drive gear. In vehicle transmissions configured in this way, this procedure has proven to be particularly suitable for shifting quickly and comfortably from the neutral gear to the drive gear. As already explained, this drive gear is, in particular, a starting gear. Consequently, in such a transmission, at least or exactly these three shift elements have to be closed to engage the starting gear.

Here too, the proposed method for operating a multi-ratio vehicle transmission provides that at least one transmission state is determined when the neutral gear is engaged and, if the transmission is in a state with increased drag losses when the neutral gear is engaged, a shift element for a reverse gear of the vehicle transmission is closed at least partially. The other shift elements of the vehicle transmission, on the other hand, are ventilated, i.e. opened.

This reverses a direction of torque at the output of the vehicle transmission, as a result of which the increased drag losses of the vehicle transmission are offset and an unwanted rolling state of the vehicle is prevented.

In one design of the proposed method, when the neutral gear is engaged, the first of these shift elements is initially ventilated once it has been detected that vehicle brake is being released and the transmission is in the state with increased drag losses. The first shift element is thus brought into the safely open state in a targeted manner. In addition, the second of these shift elements is ventilated when the neutral gear is engaged if it has been detected that the vehicle is in the rolling state while the first shift element has already been vented. The second shift element is thus also brought into the safely open state in a targeted manner.

Since the third shift element is already ventilated and therefore safely open, there is no need for further action here.

Here too, it is further provided that a shift element of the reverse gear of the vehicle transmission is only closed when the neutral gear is engaged and the vehicle brake is released once it has been determined that the vehicle is in the rolling state despite a ventilated first shift element, a ventilated second shift element, and a ventilated third shift element. The shift element of the reverse gear is then brought into an at least partially closed state in a targeted manner, as a result of which a direction of torque at the output of the vehicle transmission is reversed. The increased drag torques of the vehicle transmission can thus be offset and an unwanted rolling state of the vehicle can be ended.

Preferably, at least or exactly three shift elements are closed in the vehicle transmission in all travel gears. Such transmissions have proven to be comfortable and fuel-efficient. DE 10 2005 002 337 A1, shows preferred variants of such transmissions.

The following steps can be provided for a possible actuation of the multi-ratio vehicle transmission:

The neutral gear of the vehicle transmission is requested, for example requested automatically or by a user of the vehicle by moving the gear shift mechanism to the gear shift mechanism position "neutral."

When the neutral gear is requested, a transmission state of the vehicle transmission is determined first. If the transmission is in a state with increased drag losses, a shift element for a reverse gear of the vehicle transmission is closed at least partially, while the other shift elements of the vehicle transmission are vented, i.e. opened. The at least partial closing of the shift element for the reverse gear can thus prevent an unwanted rolling state of the vehicle.

If the driver then requests a forward gear as the starting gear, the shift element for the reverse gear is opened and the shift elements for the forward gear are filled in an appropriate procedure and brought into a closed state. If, on the other hand, the driver requests a reverse gear as the starting gear, the partially closed shift element of the reverse gear is brought into a closed state or the already closed shift element of the reverse gear remains closed. If at least one further shift element actuated via pressure medium has to be closed to engage the reverse gear, this shift element, too, is filled and brought into a closed state.

On the other hand, if the vehicle brake is being actuated when the neutral gear is engaged, at least one shift element actuated via pressure medium is at least prefilled to engage the starting gear. This shift element has to be closed when shifting into the starting gear. If two shift elements actuated via pressure medium have to be closed to engage the starting gear, the first of the shift elements can be prefilled and the second of the shift elements can be closed now. If three shift elements actuated via pressure medium have to be closed to engage the starting gear, the first of the shift elements can be prefilled, the second of the shift elements can be closed now already, and the third of the switching elements can be ventilated. The shift element of the reverse gear, on the other hand, is vented again, i.e. opened, when the vehicle brake is actuated. The reaction time when engaging a gear can thus be reduced.

The proposed method is controlled by the likewise proposed transmission control device. This means that the transmission control device carries out the method. The proposed transmission control device is therefore specifically configured to execute the method with the respective stated steps. For this purpose, the transmission control device, in particular, comprises an input and an output and a calculation means. For this purpose, the transmission control device is, in particular, further equipped with a storage medium (data memory) in which the commands specifically required for execution are stored. The input of the transmission control device is configured such that the required information, for example the current transmission temperature, the current output rotation speed and/or the current brake signal, is provided to the transmission control device via said input.

The output of the transmission control device is configured to output the required control signals for actuating the shift elements, for example signals for opening and closing valves of the shift element, to the transmission control device via said output. The calculation means executes the commands stored in the storage medium by processing the incoming information and outputting the corresponding control signals for the shift elements. The calculation means is, in particular, a microprocessor.

A computer-readable storage medium is also proposed. The storage medium comprises commands which, when executed by a computer, prompt said computer to execute the proposed method. By executing the stored commands with the transmission control device, the transmission control device is thus able to carry out the proposed method.

BRIEF DESCRIPTION OF THE DRAWING

The invention is explained in more detail below with reference to FIG. 1, which shows a schematic illustration of an arrangement of shafts, planetary gear sets, and shift elements of a multi-speed vehicle transmission, in accordance with an embodiment of the present disclosure.

DETAILED DESCRIPTION

FIG. 1 shows a schematic illustration of the arrangement of shafts AN, AB, 1, 2, 3, 4, 5, 6, 7, 8 and planetary gear sets RS1, RS2, RS3, RS4 and shift elements A, B, C, D, E of a preferred multi-ratio vehicle transmission having a planetary design. For the sake of clarity, only the upper half of the vehicle transmission is shown. The lower half is in particular configured as a mirror image of this upper half. The structure and the operating principle of the vehicle transmission shown in FIG. 1 correspond to that shown in FIG. 4 of DE 10 2005 002 337 A1. For further details, reference is therefore expressly made to the relevant explanations in this document.

The drive shaft AN is usually coupled to the drive engine of the vehicle or capable of being coupled to it via a separate clutch, such as in particular via a hydrodynamic torque converter. The output shaft AB is usually coupled or capable of being coupled to drive wheels of the vehicle.

FIG. 1 also shows a transmission control device 10, which is used to actuate the shift elements A, B, C, D, E of the transmission. The control device 10 thus causes the shift elements A, B, C, D, E to selectively be opened and closed. This engages the gear that is appropriate in the respective situation or is requested by an operator of the vehicle. For this purpose, relevant information is provided to the control device 10 via the control device input. The control device 10 processes this information and outputs corresponding signals for actuating the shift elements A, B, C, D, E via the control device output.

The control device 10 is in particular provided with the information Br, T and $n_{AB}$. The information Br is a brake signal of the service brake of the vehicle, which represents an actuation state of the brake. Of the service brake, only the brake pedal 11 is shown in FIG. 1. The brake signal Br is obtained by means of a position sensor of the brake pedal 11, for example. The information T is a temperature signal, which represents the transmission temperature. The temperature signal T is obtained by means of a temperature sensor of the transmission, for example. The information $n_{AB}$ is a rotation speed signal, which represents the rotation speed at the output shaft AB.

The shift elements A, B, C, D, E are usually actuated via pressure medium. Each shift element A, B, C, D, E is assigned an actuating piston, which can be individually pressurized with the pressure medium. To do this, the valves assigned to the actuating pistons are controlled by the control device 10. The used pressure medium is usually the lubricant of the transmission (transmission oil) in the transmission shown in FIG. 1.

The transmission can be shifted into a neutral gear in which the drive shaft AN is decoupled from the output shaft AB. For this purpose, a sufficient number of the shift elements A, B, C, D, E are opened, in particular the shift elements B, C, D, E, The travel gears of the transmission serve to move the vehicle. Eight forward gears and one reverse gear are therefore available as travel gears.

In the transmission shown in FIG. 1, three of the five shift elements A, B, C, D, E are always closed in the travel gears and the remaining two shift elements A, B, C, D, E are open.

The starting gear is used to accelerate the vehicle from a standstill or from very low speeds. The starting gear therefore has a relatively high gear ratio. Depending on the load condition and the desired direction of travel, the first gear (shift elements A, B, C closed and D, E open) or the second gear (shift elements A, B, E closed and C, D open) or the reverse gear (shift elements A, B, D closed and C, E open) is in particular suitable as the starting gear of the transmission.

A preferred procedure for operating a transmission when the neutral gear is engaged is explained in the following using the transmission in FIG. 1 as an example. This procedure can also be used for other vehicle transmissions. This procedure is carried out by the transmission control device 10, which is specially configured accordingly. As already described above, the engagement of the neutral gear is requested by the operator of the vehicle, for example, or an automatic transmission.

For the neutral gear, at least the shift elements B, C, D, E are opened. In this example, the first gear is used as the starting gear. For this purpose, the shift elements A, B, C have to be closed and the shift elements D, E have to be open.

When the neutral gear is engaged, it is first provided that it be determined whether the transmission is in a state with increased drag losses. This can be carried out by the control device 10 comparing the current temperature T of the transmission with a threshold value. The threshold value is 40° C., for example. If the determined temperature T is below this value, the transmission is still relatively cold and the transmission lubricant correspondingly has high viscosity. Therefore, relatively high drag losses are to be expected in the transmission, i.e. the transmission is in the state with increased drag losses. If the determined temperature T is above the threshold value, the transmission is sufficiently warm and the lubricant correspondingly has low viscosity. Therefore, low drag losses are to be expected in the transmission, i.e. the transmission is not in the state with increased drag losses. As described above, there are also other ways to determine whether the transmission is in this state.

If a transmission state with increased drag losses has been detected, it is provided that the shift element D for the reverse gear of the vehicle transmission is closed at least partially. The shift element D is not a shift element A, B, C of the first gear of the vehicle transmission to be actuated. The other shift elements A, B, C, E of the vehicle transmission, on the other hand, are ventilated, i.e. brought into an open state.

This reverses a direction of torque at the output of the vehicle transmission, as a result of which the increased drag losses of the vehicle transmission are offset and an unwanted rolling state of the vehicle is prevented.

The shift element D for the reverse gear of the vehicle transmission can, for example, be brought into the partially closed state with a constant pressure. A contact pressure of the shift element D plus an offset, for example, can be set as the pressure. In the partially closed state, the shift element can be closed with a pressure in the range from 2 bar to 8 bar, for example. The shift element D for the reverse gear can, in particular, be pressurized with a pressure of 3 bar to bring it into the partially closed state. In the closed state, on the other hand, the shift element D can be pressurized with a pressure in the range from 10 bar to 12 bar.

The pressure for closing the shift element D of the reverse gear can alternatively be increased by a pressure regulator to a pressure level that reduces the drag losses of the vehicle transmission in such a way that the unwanted rolling state of the vehicle is prevented. If no distinction is made between "rolling due to drag losses" and "rolling due to a downhill grade" when determining the rolling state of the vehicle, it is further provided that the pressure for closing the shift element D is limited to a maximum value by the pressure regulator.

In the "rolling due to drag losses" state, rolling of the vehicle would reliably be prevented by adjusting the maximum pressure. In the "rolling due to a downhill grade" state, the pressure regulator would reach the maximum value. The shift element D would, however, not be pressurized beyond the maximum value to prevent rolling downhill.

In one design of the proposed method for operating the vehicle transmission, it is determined whether the service brake of the vehicle has been released. This is, in particular, accomplished in that the transmission control device 10 receives and evaluates the brake signal Br from the vehicle brake system.

It is also possible to determine whether the vehicle is in the rolling state. In other words, there is a check to find out whether the vehicle has started when the neutral gear is engaged. For this purpose, it is, in particular, determined whether the rotation speed $n_{AB}>0$ is present at the output shaft AB.

If the service brake is not released, the vehicle is prevented from starting by the service brake. The transmission can therefore be prepared for the gear shift to the starting gear when the neutral gear is engaged. This enables a quick and comfortable subsequent gear shift to the drive gear. The shift element A is therefore closed and the shift element B is prefilled. The shift element C is ventilated or remains ventilated. The shift elements D, E are open.

If the service brake is released when the neutral gear is engaged, the vehicle can in principle start moving because it is no longer secured against starting. If the transmission is also not in the state with increased drag losses, the above-described preparation for the gear shift to the starting gear can still be carried out or maintained. There is then no increased risk of the vehicle starting, despite the service brake being released and the neutral gear being engaged. If the transmission is in the state with increased drag losses, however, the shift element B is ventilated as a precaution.

Any prefilling that may already have occurred in the shift element B is then discharged and the shift element B is brought into the safely open state. In this way, unwanted starting in the neutral gear is prevented at a first safety level. If the rolling state is detected despite the ventilation of the shift element B, the shift element A is ventilated as well. The shift element A is thus also brought into the safely open state. In this way, further unwanted starting in the neutral gear is prevented at a second safety level.

If it is detected that the vehicle is in the rolling state despite ventilated shift element B and ventilated shift element A, it is provided at a third safety level that the shift element D of the reverse gear of the vehicle transmission is closed at least partially. This reverses a direction of torque at the output of the vehicle transmission and the unwanted rolling state of the vehicle is ended.

As soon as it is determined later that the service brake is actuated again when the neutral gear is engaged, the above-described preparation for the gear shift to the starting gear can be carried out.

LIST OF REFERENCE NUMERALS

1 Shaft
2 Shaft
3 Shaft
4 Shaft
5 Shaft
6 Shaft
7 Shaft
8 Shaft
10 Transmission control device
11 Brake pedal
100 Step
200 Step
300 Step
400 Step
500 Step
600 Step
700 Step
A Shift element
B Shift element
C Shift element
D Shift element
E Shift element
AN Drive shaft
AB Output shaft
GG Housing
RS1 Planetary gear set
RS2 Planetary gear set
RS3 Planetary gear set
SO3 Sun gear

The invention claimed is:

1. A method for operating a multi-speed vehicle transmission, comprising:
providing a plurality of shift elements for engaging gears of the vehicle transmission having an input and an output;
engaging a neutral gear in which the input and the output are decoupled from each other such that propulsion is not transmitted therebetween via the vehicle transmission;
coupling the input to the output in a drive gear for propelling the vehicle by closing at least one shift element of the plurality of shift elements;
determining, when the neutral gear is engaged, at least one transmission state of the vehicle transmission; and
of the plurality of shift elements, closing, at least partially, another shift element for a reverse gear when the vehicle transmission is determined to be in a transmission state with increased drag losses when the neutral gear is engaged; and
determining an actuation state of a vehicle brake in addition to the transmission state when the neutral gear is engaged;
ventilating the other shift element for the reverse gear when the neutral gear is engaged and the vehicle brake is actuated; and
of the plurality of shift elements, preloading or prefilling with a pressure medium the at least one shift element for a forward gear.

2. The method according to claim 1, wherein further shift elements of the plurality of shift elements are ventilated when the neutral gear is engaged and the vehicle transmission is in the transmission state with increased drag losses.

3. The method according to claim 1, wherein determining the transmission state with increased drag losses comprises using one or more of (i) a transmission temperature (T), (ii) an operating time of the vehicle transmission since an engine start of a drive engine coupled or capable of being coupled to the vehicle transmission, and (iii) a temperature model of the vehicle transmission.

4. The method according to claim 3, wherein determining the transmission state with increased drag losses comprises using the transmission temperature and wherein using the transmission temperature includes determining a lubricant temperature of the vehicle transmission.

5. The method according to claim 1, comprising:
closing first and second shift elements of the plurality of shift elements when the vehicle transmission is in the drive gear, the first shift element being the at least one shift element; and
when the neutral gear is engaged, at least one of:
(I) detecting that the vehicle brake is being released;
determining that the vehicle transmission is in the transmission state with increased drag losses; and
ventilating the first shift element of the first and the second shift elements; and
(II) detecting that the vehicle brake is being released;
determining that the vehicle transmission is in the transmission state with increased drag losses;
determining that the vehicle is rolling; and
ventilating the second shift element of the first and the second shift elements; and
(III) detecting that the vehicle brake is being released;
determining that the vehicle transmission is in the transmission state with increased drag losses;
determining that the vehicle is rolling despite the ventilated first shift element and the ventilated second shift element; and
at least partially closing the other shift element for the reverse gear.

6. The method according to claim 5, wherein determining that the vehicle is rolling includes using one or more of (i) an output rotation speed of the vehicle transmission, (ii) a wheel rotation speed of the vehicle, and (iii) an acceleration of the vehicle.

7. The method according to claim 5, wherein, when the neutral gear is being engaged and when the vehicle brake is actuated, the method comprises:
preloading or prefilling with the pressure medium the first shift element of the first and the second shift elements for the drive gear, and closing the second shift element of the first and the second shift elements for the drive gear.

8. The method according to claim 5, comprising:
closing, in the drive gear, at least the first and the second shift elements, and a third shift element of the plurality of shift elements of the vehicle transmission; and
when the neutral gear is being engaged and the vehicle brake is actuated;
preloading or prefilling with the pressure medium the first shift element of the first, the second and the third shift elements;
closing the second shift element of the first, the second and the third shift elements; and
ventilating the third shift element of the first, the second and the third shift elements.

9. The method according to claim 8, wherein the first the second and the third shift elements are closed in all travel gears in the vehicle transmission.

10. A transmission control device for actuating a plurality of shift elements of a multi-speed vehicle transmission, wherein the transmission control device is configured to carry out the method according to claim 1.

11. A non-transitory computer-readable storage medium comprising commands which, when executed by a computer, prompt said computer to execute the method according to claim 1.

* * * * *